United States Patent
Ganesh et al.

(10) Patent No.: US 10,042,427 B2
(45) Date of Patent: Aug. 7, 2018

(54) INTERACTIVE SYSTEM AND METHOD FOR ENHANCING ADAPTABILITY OF AN INTERACTIVE SURFACE ENVIRONMENT

(71) Applicant: Wipro Limited, Bangalore (IN)

(72) Inventors: Sangita Ganesh, Chennai (IN); Manoj Madhusudhanan, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 275 days.

(21) Appl. No.: 14/859,836

(22) Filed: Sep. 21, 2015

(65) Prior Publication Data
US 2017/0031448 A1    Feb. 2, 2017

(30) Foreign Application Priority Data
Jul. 31, 2015  (IN) ............... 3967/CHE/2015

(51) Int. Cl.
| | | |
|---|---|---|
| G06F 3/048 | (2013.01) | |
| G06F 3/01 | (2006.01) | |
| G06F 3/0484 | (2013.01) | |
| H04L 12/28 | (2006.01) | |

(52) U.S. Cl.
CPC .......... G06F 3/017 (2013.01); G06F 3/04845 (2013.01); H04L 12/2816 (2013.01)

(58) Field of Classification Search
CPC .......... G06F 3/011–3/013; G06F 3/017; G06F 17/30082
See application file for complete search history.

(56) References Cited

U.S. PATENT DOCUMENTS

| | | | |
|---|---|---|---|
| 7,259,747 B2 | 8/2007 | Bell | |
| 7,775,883 B2 | 8/2010 | Smoot et al. | |
| 8,793,611 B2 | 7/2014 | Van Os | |
| 2011/0043443 A1* | 2/2011 | Kawano | G06F 3/017 |
| | | | 345/156 |
| 2011/0234493 A1 | 9/2011 | Kravits et al. | |
| 2011/0246329 A1* | 10/2011 | Geisner | G06F 3/017 |
| | | | 705/27.1 |
| 2015/0248201 A1* | 9/2015 | Shankar | G06F 3/0484 |
| | | | 715/746 |

FOREIGN PATENT DOCUMENTS

WO    WO 2004/086208 A2    10/2004

* cited by examiner

*Primary Examiner* — Claudia Dragoescu
(74) *Attorney, Agent, or Firm* — Finnegan, Henderson, Farabow, Garrett & Dunner, LLP

(57) ABSTRACT

The present disclosure relates to a method for enhancing adaptability of an interactive surface environment having a plurality of objects. The method comprises receiving at least one user gesture performed on a target object from the plurality of objects. The further comprises identifying a context for each of the at least one user gesture performed on the target object based on at least one of the at least one user gesture, target object parameters, and object parameters. The method further comprises aggregating the at least one user gesture performed on the target object and the context to obtain a decision dataset. The method further comprises identifying an impact, to be rendered, by comparing the decision dataset with predefined datasets. The method further comprises rendering the impact on one or more objects from the plurality of objects in the interactive surface environment.

20 Claims, 7 Drawing Sheets

| User Gesture Input | Objects | Context | Decision | Impact |
|---|---|---|---|---|
| G1 | O1 | C1 | (G1, O3, C1) | I1 |
| G2 | O2 | C2 | (G2, O1, O2, C2) | I2 |
| G3 | O3 | - | | I3 |

INTERACTIVE SYSTEM AND METHOD FOR ENHANCING ADAPTABILITY OF AN INTERACTIVE SURFACE ENVIRONMENT

TECHNICAL FIELD

The present subject matter is related, in general to interactive environments, and more particularly, but not exclusively to an interactive system and method for enhancing adaptability of an interactive surface environment having a plurality of objects.

BACKGROUND

Generally, an interactive surface refers to a surface which facilitates a user and/or multiple users to interact with each other and/or applications of an interactive computer system associated with the interactive surface. The interactive surface is created for various requirements which include, but are not limited to, gaming, military, and business requirements. In the interactive surface, the user and/or the multiple users can interact via gestures and motions.

In one conventional method, interaction is facilitated based on gestures and motions performed by the user and/or the multiple users. In particular, a change in states of a target object in the interactive surface takes place upon detecting the gestures and motions of the user and/or the multiple users on the target object. However, in the conventional method, state changes of each user and state changes of other objects relative to the gestures and motions on the target object, present in the interactive surface, is not considered for providing better adaptability of the interactive surface to each user. Due to failure in understanding the state changes of the other objects relative to the target object, there causes failure in adaptability of each user in relation to the other objects in the interactive surface. Particularly, in the conventional method, contexts of each of the gestures and motions and the interactive surface are not considered.

In another conventional method, motions of the user and/or the multiple users on the target object are taken into consideration for providing interactions. However, the motions performed by the target object based on motions and gestures of the other objects in the interactive surface is not taken into consideration for understanding the dynamicity of the interactive surface. Such understanding of the motions and gestures of the other objects are also very important to understand the interaction to be achieved in the interactive surface.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

In one embodiment, the present disclosure relates to a method for enhancing adaptability of an interactive surface environment having a plurality of objects. The method comprises receiving at least one user gesture performed on a target object from the plurality of objects. The method further comprises identifying a context for each of the at least one user gesture performed on the target object based on at least one of the at least one user gesture, target object parameters, and object parameters. The method further comprises aggregating the at least one user gesture performed on the target object and the context to obtain a decision dataset. The method further comprises identifying an impact, to be rendered, by comparing the decision dataset with predefined datasets. The method further comprises rendering the impact on one or more objects from the plurality of objects in the interactive surface environment.

In another embodiment, the present disclosure relates to an interactive system for enhancing adaptability of an interactive surface environment having a plurality of objects. The system comprises a processor and a memory communicatively coupled to the processor, wherein the memory stores processor-executable instructions, which, on execution, cause the processor to perform operations to receive at least one user gesture performed on a target object from the plurality of objects. The processor is further configured to identify a context for each of the at least one user gesture performed on the target object based on at least one of the at least one user gesture, target object parameters, and object parameters. The processor is further configured to aggregate the at least one user gesture performed on the target object and the context to obtain a decision dataset. The processor is further configured to identify an impact, to be rendered, by comparing the decision dataset with predefined datasets. The processor is further configured to render the impact on one or more objects from the plurality of objects in the interactive surface environment.

In another embodiment, the present disclosure relates to a non-transitory computer readable medium including instructions stored thereon that when processed by at least one processor causes an interactive system for enhancing adaptability of an interactive surface environment having a plurality of objects to perform the act of receiving at least one user gesture performed on a target object from the plurality of objects. The act further comprises identifying a context for each of the at least one user gesture performed on the target object based on at least one of the at least one user gesture, target object parameters, and object parameters. The act further comprises aggregating the at least one user gesture performed on the target object and the context to obtain a decision dataset. The act further comprises identifying an impact, to be rendered, by comparing the decision dataset with predefined datasets. The act further comprises rendering the impact on one or more objects from the plurality of objects in the interactive surface environment.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
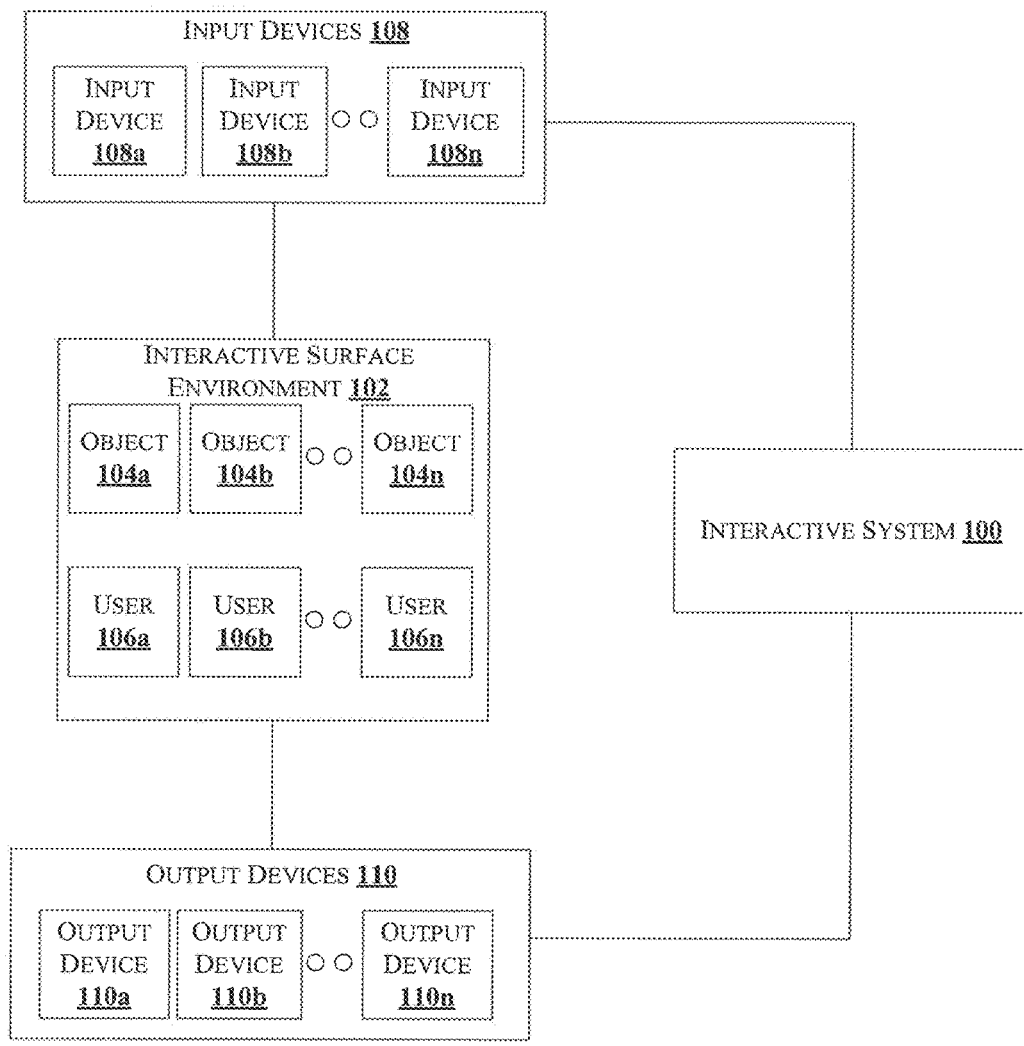
FIG. 1 illustrates an exemplary embodiment of an environment for enhancing adaptability of an interactive surface environment having a plurality of objects, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and an interactive system for enhancing adaptability of an interactive surface environment having a plurality of objects. Embodiments of the present disclosure detects context of the interactive surface environment having the plurality of objects. Particularly, the context refers to behaviour of a target object on which gestures are performed by a user and/or multiple users along with behaviour of other objects changed due to the target object. Such detection of context of the interactive surface environment predicts possible gestures to occur along with possible behaviour of each of the plurality of objects. Such a prediction, in turn enhances the adaptation of the interactive surface environment by the user and/or the multiple users according to the context of each of the plurality of objects.

The interactive surface environment refers to, without limitation, physical surface environment and virtual surface environment. In an example, the physical surface environment can be real world surface, for example house environment, office environment, laboratory etc. The virtual surface environment may include for example gaming environment, simulated applications etc. Such interactive surface environment understands user gestures and motions which include, without limitation, movement of hands, legs, fingers, head, facial expressions, eye movement etc. Such gestures and motions may be performed using external devices including, without limitation, joystick, a bat, a stick, a racquet, a toy, a ball, a vehicle, skates, a bicycle, wearable devices or assisting objects such as an orthopedic shoe, a glove, a shirt, a suit, a pair of pants, a prosthetic limb, a wheelchair, a walker, or a walking stick etc.

The interactive surface environment comprises the plurality of objects and includes presence of at least one user. The plurality of objects may be physical objects in the physical surface environment and/or virtual objects in the virtual surface environment. The plurality of objects may include, without limitation, home appliances, electric appliances, walls, gas cylinder, cot etc. in the physical surface environment, and balls, net, bats etc. in the gaming application of the virtual surface environment. The plurality of objects relates to any such objects depending on the scenarios.

An adaptability of the interactive surface environment having a plurality of objects is enhanced by performing following steps. The method comprises receiving at least one user gesture which is performed on a target object from the plurality of objects. Then, context for each of the at least one user gesture performed on the target object is identified. Here, the context includes, without limitation, state changes of each of the plurality of objects relative to the state changes of the target object due to the at least one user gesture on the target object. The context is identified based on at least one user gesture, target object parameters and object parameters. The target object parameters and object parameters includes, without limitations, shape, position, size, color etc. of the target object and the objects except target object respectively. The at least one user gesture and the context are aggregated to obtain a decision dataset. The decision dataset is compared with predefined datasets to identify an impact to be rendered. The impact includes, without limitation, change in size, change in shape, change in colour, change in sound, or change in position of the plurality of objects, lighting entities of the interactive surface environment, providing audio/video output etc. in the interactive surface environment. The impact is rendered on one or more objects from the plurality of objects and/or the one or more entities of the interactive surface environment.

FIG. 1 illustrates an exemplary embodiment of environment for enhancing adaptability of an interactive surface environment 102 having a plurality of objects 104a, 104b, . . . , 104n, individually referred to as object 104 and collectively referred to as objects 104, in accordance with some embodiments of the present disclosure.

The environment comprises an interactive system 100, the interactive surface environment 102, one or more input devices 108a, 108b, . . . , 108n (individually referred to as input device 108 and collectively referred to as input devices 108) and one or more output devices 110a, 110b, . . . , 110n (individually referred to as output device 110 collectively referred to as output devices 110). In one implementation, the interactive system 100 may be implemented in a variety of computing systems, such as a laptop computer, a desktop computer, a Personal Computer (PC), a notebook, television, play stations, smartwatch, a smartphone, a tablet, e-book readers (e.g., Kindles and Nooks), a node in a network, a server, a network server, and the like. In one example, the interactive system 100 is configured to enhance adaptability of the interactive surface environment 102 having the plurality of objects 104. The components of the interactive system 100 are explained in detail below sections of the description.

In an embodiment, the interactive system 100 is communicatively connected to the interactive surface environment 102, the one or more input devices 108 and the one or more output devices 110 over a network.

The interactive surface environment 102 refers to, without limitation, physical surface environment and virtual surface environment. In an example, the physical surface environment can be real world surface, for example house environment, office environment, laboratory etc. The virtual surface environment may include for example gaming environment, simulated applications etc. Any typical interactive surface environment 102 comprises the plurality of objects 104 and one or more users 106a, 106b, . . . , 106n (individually referred to as user 106 and collectively referred to users 106). The plurality of objects 104 may be physical objects in the physical surface environment and/or virtual objects in the virtual surface environment. The plurality of objects 104 may include, without limitation, home appliances, electric appliances, walls, floors, stairs, gas cylinder, cot, laboratory based elements like flasks, containers, office based infrastructures etc. in the physical surface environment. In the virtual surface environment, for example, in the gaming application, the plurality of objects 104 may include, without limitation, balls, net, bats, boundary lines etc. The plurality of objects 104 relates to any such objects depending on the scenarios. The one or more users 106 refer to person performing gestures on at least one of object among the plurality of objects. The one of the objects on which the user gestures or motions is performed becomes a target object and remaining objects becomes other objects (i.e. except the target object). In some scenarios, the one or more users 106 become one or more objects of the plurality of objects 104 where the one of the objects becomes the target object. Although the present subject matter discloses the user performing the gestures on a single target object, it may be noted that, the interactive system 100 of present subject matter may also cover situations where the user performs the gestures on more than one target object. For example, the user may swipe his hand across two objects at once, or another user may be interacting with another target object elsewhere in the interactive surface environment 102.

In an embodiment, the interactive surface environment 102 recognizes user gestures and motions which include, without limitation, movement of hands, legs, fingers, head, facial expressions, eye movement etc. Such gestures and motions may or may not be performed using handheld devices. In an embodiment, the handheld devices may include, but are not limited to, joystick, a bat, a stick, a racquet, a toy, a ball, a vehicle, skates, a bicycle, wearable devices or assisting objects such as an orthopaedic shoe, a glove, a shirt, a suit, a pair of pants, a prosthetic limb, a wheelchair, a walker, or a walking stick etc. In an embodiment, the interactive surface environment 102 may recognize user gestures from one user and/or from multiple users simultaneously. In an embodiment, the interactive surface environment 102 may include a display unit (not shown) as well.

The one or more input devices 108 are communicatively connected to the interactive surface environment 102 and/or the interactive system 100. In an embodiment, the one or more input devices 108 may be configured in the interactive surface environment 102. In an embodiment, the one or more input devices 108 may include, but are not limited to, camera, motion sensor, audio sensors to detect sound and other such sensors which can detect the user gestures and motions of each of the plurality of objects 104 and each user of the one or more users 106 in the interactive surface environment 102. The one or more input devices 108 are used to capture gesture and motions of each user of the one or more users 106 in the interactive surface environment 102. The one or more input devices 108 detect user gestures and motions performed on the target object among the plurality of objects 104. Also, the one or more input devices 108 detect gestures and motions of each user and state changes of other objects in the interactive surface environment 102 relative to state changes of the target object. For example, in football gaming application, a ball is considered to be the target object on which a player performs kicking. Such kicking action on the ball is detected by the one or more input devices 108. The changes in position, size, shape, sound of the ball and changes in position, movements, sound of all the players including detection of distance between the ball, the goal point, boundary line, and/or each player is detected using the one or more input devices 108. The one or more input devices 108 provide the detected image and/or audio and/or video to the interactive system 100.

The one or more output devices 110 are communicatively connected to the interactive surface environment 102 and/or the interactive system 100. In an embodiment, the one or more output devices 110 may be configured in interactive surface environment 102. The one or more output devices 110 may include, but are not limited to, lighting devices, audio devices, and video devices. In an embodiment, the one or more output devices 110 are operational when a command or trigger signals is received from the interactive system 100. For example, the lighting device may illuminate the walls or portions of floors in home environment or an audio is switched on for alerting the user present in the interactive surface environment 102. One more example, a video can be played or image can be displayed on the display unit of the interactive surface environment 102.

Figure 2:
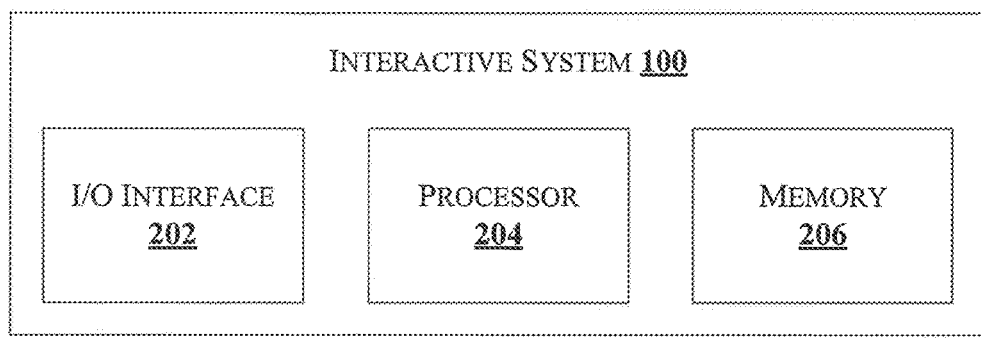
FIG. 2 illustrates an exemplary embodiment showing components of an interactive system, in accordance with some embodiments of the present disclosure.

FIG. 2 illustrates an exemplary embodiment showing component of the interactive system 100 in accordance with some embodiments of the present disclosure.

In the illustrated FIG. 2, the interactive system 100 comprises an I/O interface 202, a central processing unit ("CPU" or "processor") 204 having one or more processing units, and a memory 206 in accordance with some embodiments of the present disclosure.

The I/O interface 202 is a medium through which the at least one of user gesture or motions performed on the target object among the plurality of objects 104 from the one or more input devices 108 is captured. The I/O interface 202 receives gestures and motions achieved by the other objects and each user relative to the movement of the target object due to the at least one user gesture. The I/O interface 202 is configured to provide the trigger signals to the one or more output devices 110 based on identification of the impact associated with the at least one user gesture, the context and the plurality of objects 104 along with the one or more users 106 in the interactive surface environment 102. The I/O interface 202 is coupled with the processor 204. The processor 204 is configured to identify the impact to be rendered in the interactive surface environment 102.

The processor 204 may comprise at least one data processor for executing program components for processing system-generated user gestures, target object parameters, object parameters and context parameters. The processor 204 is configured to identify the context for each of the at least one user gesture performed on the target object. Also, the processor 204 identifies the context for each of the other objects and each user in the interactive surface environment 102. The processor 204 identifies the context based on the at least one user gesture, the target object parameters, and the object parameters. The processor 204 aggregates the at least one user gesture performed on the target object along with gestures identified from the other objects with the context to obtain the decision dataset. The processor 204 identifies the impact to be rendered by comparing the decision dataset with the predefined datasets. The processor 204 triggers the trigger signals for rendering the impact to the one or more objects of the plurality of objects 104, and/or the one or more users 106 and/or the interactive surface environment 102. Various aspects performed by the processor 204 are achieved using one or more modules that are stored in the memory 206 which are explained in below description.

The memory 206 stores instructions which are executable by the at least one processor 204. In an embodiment, the memory 206 stores user gestures information, context related parameters and predefined datasets. In an embodiment, the user gestures information, the context related parameters, and the predefined datasets are stored as one or more data required for enhancing the adaptability of the interactive surface environment 102 having the plurality of objects based on the user gestures and/or the context as described in the following description of the disclosure.

Figures 3, 4:
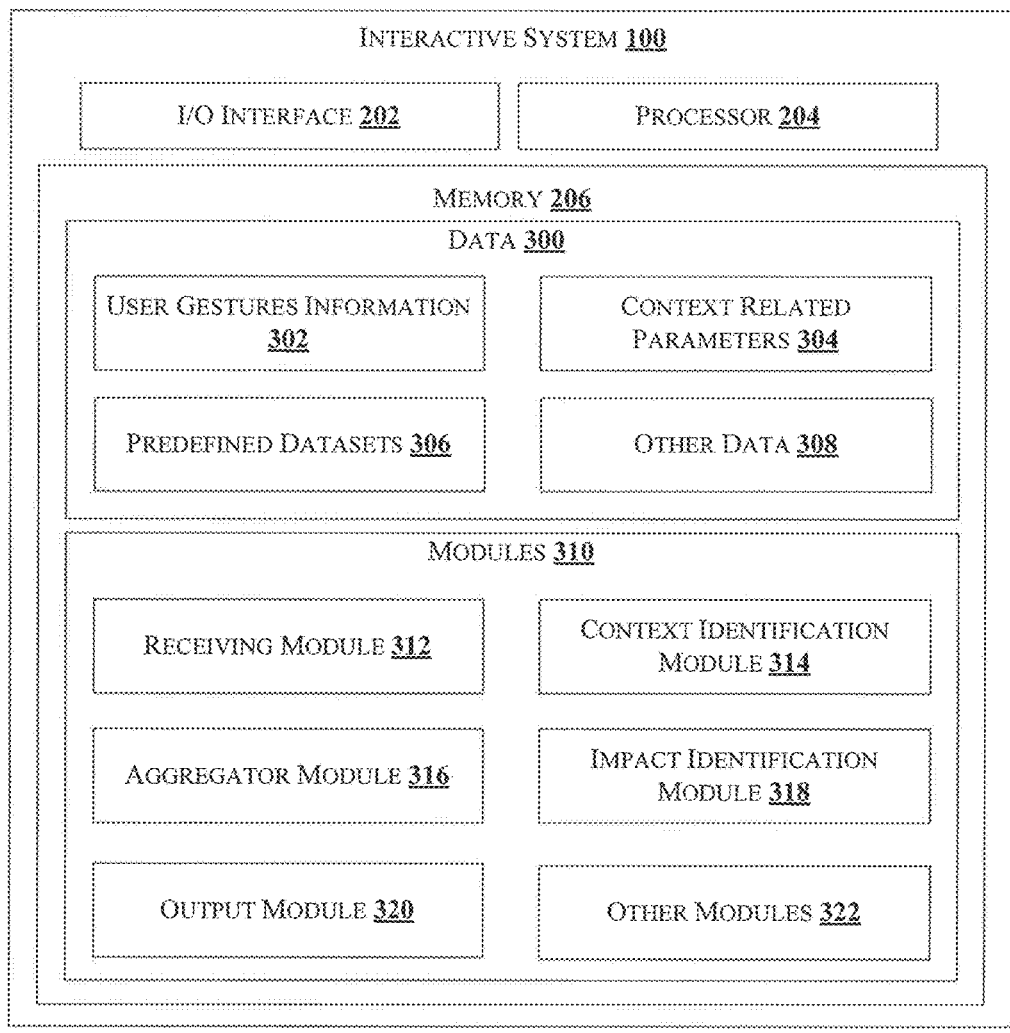
FIG. 3 illustrates a block diagram of an exemplary interactive system with various data and modules for enhancing adaptability of an interactive surface environment having a plurality of objects, in accordance with some embodiments of the present disclosure.
FIG. 4 shows an exemplary mapping diagram illustrating mapping of gesture inputs relative to different objects with respective impacts in accordance with some embodiments of the present disclosure.

FIG. 3 illustrates a block diagram of the exemplary interactive system 100 with various data and modules for enhancing the adaptability of the interactive surface environment 102 having the plurality of objects 104 in accordance with some embodiments of the present disclosure. In the illustrated FIG. 3, the one or more data 300 and the one or more modules 310 stored in the memory 206 are described herein in detail.

In an embodiment, the one or more data 300 may include, for example, the user gestures information 302, the context related parameters 304, the predefined datasets 306, and other data 308 for enhancing the adaptability of the interactive surface environment 102 having the plurality of objects 104.

The user gestures information 302 refers to gestures and motions likely performed by the one or more users 106 on the target object in the interactive surface environment 102. The user gestures information 302 also includes such kind of gestures and motions attained by each user, and each of the other objects relative to the target object in the interactive surface environment 102.

The context related parameters 304 refers to state changes of the target object, and/or the other objects and/or the one or more users 106 in the interactive surface environment 102. The context related parameters 304 includes, without limitations, user parameters, target object parameters, and object parameters. The user parameters refer to position and motions of each user in the interactive surface environment 102. The target object parameters refer to position, size, shape, color and sound of the target object changed due to the user gesture performed on the target object. The object parameters position, size, shape, color and sound of the other objects changed relative to the user gesture performed on the target object.

The predefined datasets 306 are stored in a decision database (not shown) of the memory 206. The predefined datasets 306 comprise at least one user gesture input associated with the one or more objects along with the corresponding context. The predefined datasets 306 comprise impacts corresponding to the respective user gesture inputs, the objects and contexts associated with each other. Table 1 below shows the exemplary predefined datasets 306:

TABLE 1

| User Gesture Input | Objects | Context | Impact |
|---|---|---|---|
| G1 | O1 | C1 | I1 |
| G2 | O2 | C2 | I2 |
| G3 | O3 | — | I3 |

The other data 308 may refer to such data which can be referred for enhancing the adaptability of the interactive surface environment 102.

In an embodiment, the one or more data 300 in the memory 206 are processed by the one or more modules 310 of the interactive system 100. The one or more modules 310 may be stored within the memory 206 as shown in FIG. 3. In an example, the one or more modules 310, communicatively coupled to the processor 204, may also be present outside the memory 206 and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the one or more modules 310 may include, for example, a receiving module 312, a context identification module 314, an aggregator module 316, an impact identification module 318, and an output module 320. The memory 206 may also comprise other modules 322 to perform various miscellaneous functionalities of the interactive system 100. It will be appreciated that such aforementioned modules may be represented as a single module or a combination of different modules.

The receiving module 312 receives the at least one user gesture performed on the target object among the plurality of objects 104 in the interactive surface environment 102 from the one or more input devices 108. Further, changes in state of the target object upon user gesture and state changes of the one or more users and the one or more other objects in the interactive surface environment 102 is received from the one or more input devices 108 by the receiving module 312. For example, considering virtual surface environment such as football gaming application environment where each player are considered to be the users, the ball is considered to be the target object and the boundary line and goal portion is considered to be the other objects. The input device 108 detects the kicking action on the ball which is in turn is received by the receiving module 312. Further, state changes of the ball and state changes of each player along state changes of each of the other objects in the gaming application relative to state change of the ball is received. In an embodiment, the state changes refer to changes in position and sound of the ball, each player and the other objects.

In an example, if a user performs a gesture which is not predefined or not present in the user gestures information 302, for example a flick of the thumb), the receiving module 312 may recognize the flick of a thumb as a new gesture and add to the user gestures information 302.

The context identification module 314 identifies the context for each of the at least one user gesture performed on the target object based on the at least one of user gesture, target object parameters and the object parameters and context parameters. In an embodiment, the context refers to context of the interactive surface environment 102 in which the target object, the other objects and the one or more users 106 are present. The context includes, without limitation, changes in position, shape, color, size, sound of each of the target object, the other objects and the one or more users 106 in the interactive surface environment 102. The context further includes, without limitation, distance, and measurement of each of the target object, the other objects and the one or more users 106 encountered with each other. For example, in the gaming application, position and sound of the ball after being kicked is considered to be the context. Also, position of each player and goal relative to the ball after being kicked is considered to be the context. Further, distance of each player with respect to the ball and the goal or other players is also considered to be the context. In an example, the context may be presorted in the data 300 during configuration. In another example, the context may be generated during the runtime.

The aggregator module 316 aggregates the at least one user gesture performed on the target object and the context to obtain a decision dataset. For example, assuming player 1 has kicked the ball towards left near to the boundary line. After kicking, the ball moves towards the boundary line and accordingly all the players move towards the ball. The context of the ball and boundary line is aggregated along with player's kicking action on the ball. Such combination decides that player 8, who is assumed to be proximal to the ball, is required to kick the ball away from the boundary line as per decision dataset.

The impact identification module 318 identifies the impact to be performed on the target object and/or the other objects and/or in the interactive surface environment 102. FIG. 4 shows the mapping of user gesture inputs relative to different objects with respective impacts. For example, in the illustrated FIG. 4, with the combination of user gesture G1 on the object O3 with the context C1 decides the impact I2 to be rendered. Similarly, user gesture G2 on the objects O1, O2 with the context C2 decides the impact I3 to be rendered. For example, considering from the player actions on the ball, and the context of each player and other objects in the ground, player 8, who is assumed to be proximal to the ball, is required to kick the ball away from the boundary line.

With such decision and combination of the action on the ball along with the context of each player and the other objects in the ground, the impact 'I' is identified which illustrates to point at player 8 for indicating the player 8 to run towards the ball. In other way, the ball is indicated with a light on the ball so that the players run towards the ball. Further, it may be understood by person skilled in the art that one-to-one relationships, one-to-many relationships/many to one, many-to-many relationships may exist between the gestures and the objects, and the objects and the context. For example, one gesture may be performed on several objects, an object can be in several contexts, and many gestures can be performed on a single object or several objects can be in a single context.

The impact identified is rendered on the target object and/or the other objects and/or the one or more users 106 and/or the interactive surface environment 102. Such rendering of the impact is performed through the output module 320. The impact is rendered to the one or more output devices 110 via trigger signals. For example, the player 8 or the ball is indicated by the light device which illuminates light on the player 8 or the ball. Another example, the player 8 is informed via audio/video communications or the ball is indicated via the audio/video communications by the audio/video devices. In an example, if a new object is placed in the interactive surface environment 102 midway through, the receiving module 312 may recognize the new object. Upon recognizing the new object, the context identification module 314 may identify a change in the context. Thereafter, the impact identification module may adapt the behavior of the target objects accordingly.

FIGS. 5a to 5d illustrate an example of a home environment having a child where the contexts, target object parameters, object parameters and child gestures are detected in accordance with some embodiments of the present disclosure. In the example, in FIG. 5a, the home environment is considered to be the interactive surface environment 102 and floors of the home environment as one of the objects. Consider a child represented with a smiley face, a cylinder and a food present on the floor. The child is considered to be the user and cylinder and food are considered as the objects.

Figure 5A:
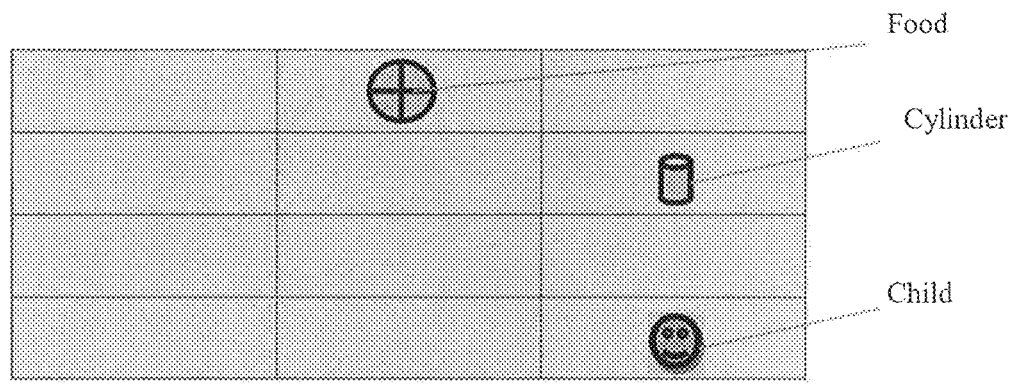
FIGS. 5a to 5d illustrate an example for detecting contexts, target object parameters, object parameters and user gestures in accordance with some embodiments of the present disclosure.
Figure 5B:
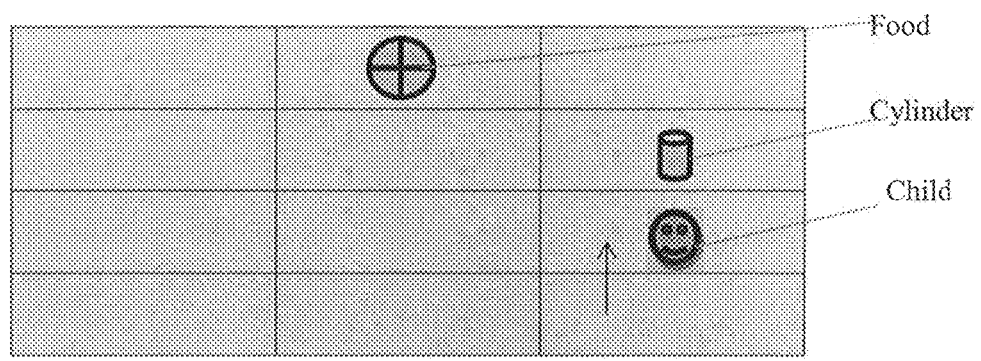

In FIG. 5b, assuming the child is crawling towards the cylinder which is usually dangerous for the child. The child action is the user gesture and state changes of the child are with respect to the state changes of the cylinder and food i.e. distance in this case.

Figure 5C:
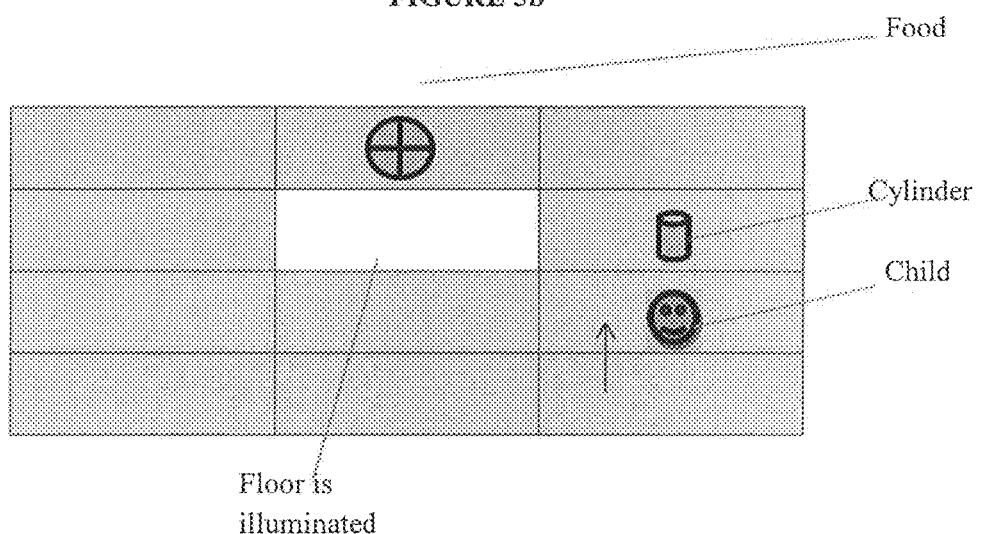
Figure 5D:
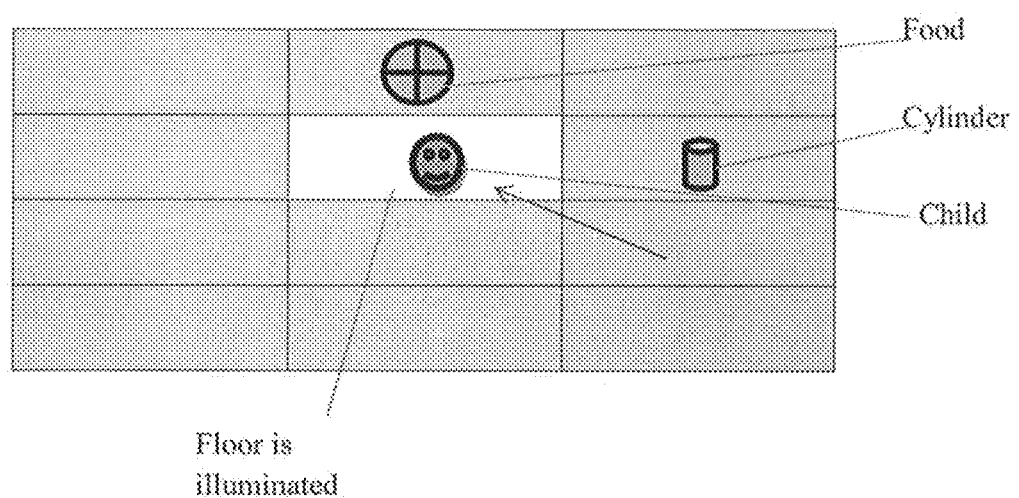

In FIG. 5c, in order to avoid the child reaching proximal to the cylinder, an impact is identified from the combination of the state changes of the child with respect to the state changes of the cylinder and food. Thus, the lighting device is triggered to illuminate floor next to the food so that the child is attracted towards the food instead of the cylinder. Then, the child is attracted towards the food which moves itself towards the food as shown in FIG. 5d. In an implementation, if the interactive system 100 determines that the child has changed his path and already moving towards the food before the impact is rendered on the floor, in such cases, the interactive system 100 may not render the impact on the floor as the context of child's path and the context determined for making the child reach to the food will be same. Similarly, in an example, if the child has already reached the food, then the interactive system 100 may not render the impact on the objects, i.e., floor in FIG. 5(c).

Figure 6:
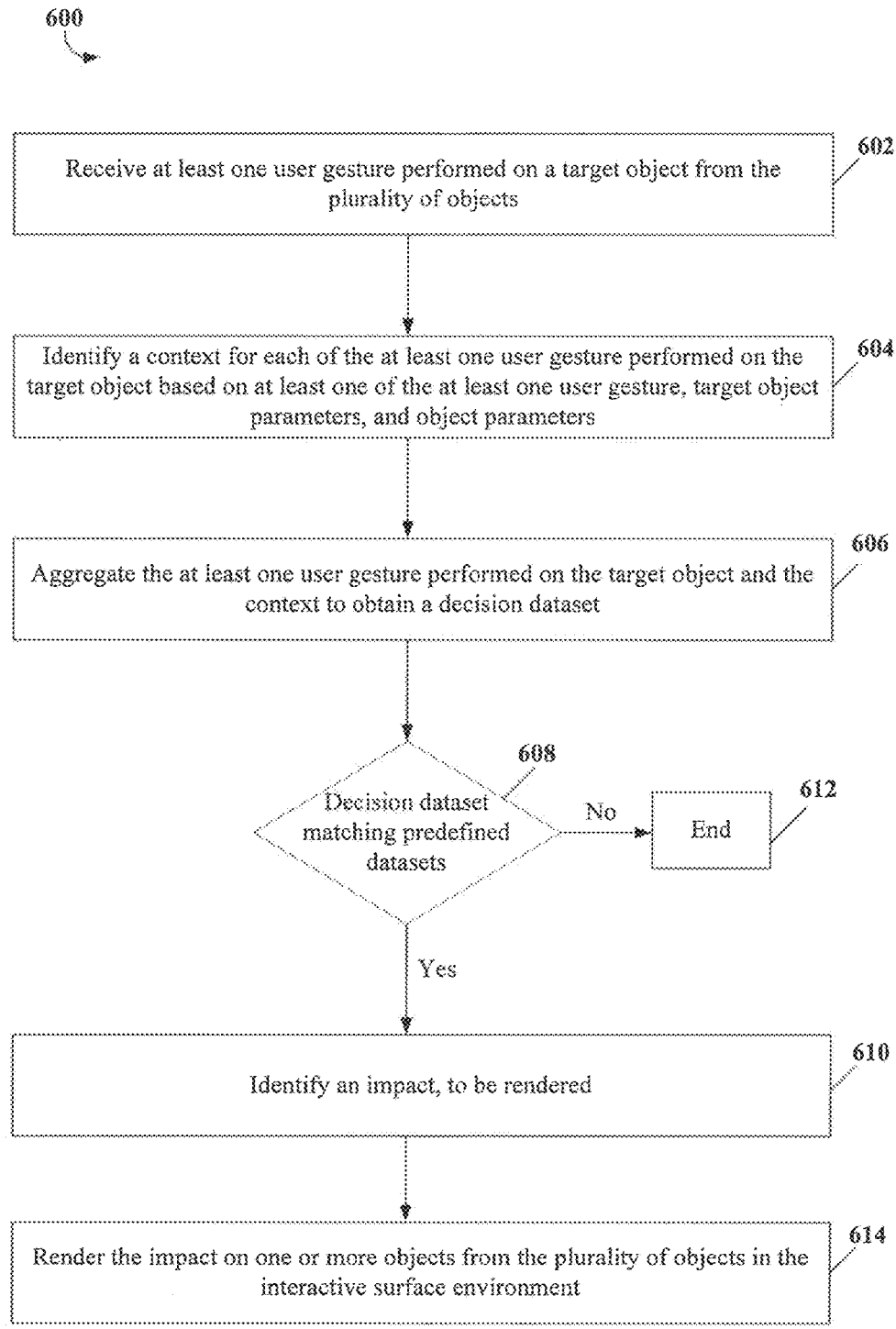
FIG. 6 shows a flowchart illustrating a method for enhancing adaptability of an interactive surface environment having a plurality of objects in accordance with some embodiments of the present disclosure.

FIG. 6 shows a flowchart illustrating a method 600 for enhancing the adaptability of the interactive surface environment 102 having the plurality of objects 104 in accordance with some embodiments of the present disclosure.

As illustrated in FIG. 6, the method 600 comprises one or more blocks for enhancing the adaptability of the interactive surface environment 102. The method 600 may be described in the general context of computer executable instructions. Generally, computer executable instructions can include routines, programs, objects, components, data structures, procedures, modules, and functions, which perform particular functions or implement particular abstract data types.

The order in which the method 600 is described is not intended to be construed as a limitation, and any number of the described method blocks can be combined in any order to implement the method. Additionally, individual blocks may be deleted from the methods without departing from the scope of the subject matter described herein. Furthermore, the method 600 can be implemented in any suitable hardware, software, firmware, or combination thereof.

At block 602, at least one user gesture performed on the target object is received from the plurality of objects. In an embodiment, each of the plurality of objects includes, without limitation, the physical object and the virtual object. In an embodiment, the at least one user gesture comprises movement of feet, movement of arms, movement of legs, movement of fingers, movement of legs, movement of hands, movement of head, and combination thereof.

At block 604, the context for each of the at least one user gesture performed on the target object based on the at least one user gesture, the target object parameters, and/or the object parameters. In an embodiment, the target object parameters comprises a position, a shape, a sound, a size, or a color of the target object, and the object parameters comprises a position, a shape, a sound, a size, or a color of objects from the plurality of objects except the target object.

At block 606, the at least one user gesture performed on the target object and the context are aggregated to obtain a decision dataset;

At block 608, a condition is checked whether the decision dataset is matching with the predefined datasets. If the decision dataset is matching with the predefined datasets, then the method proceed to block 610 via "YES". In an embodiment, the predefined datasets are received from the decision database, and each of the predefined datasets comprises the at least one user gesture input associated with one or more objects from the plurality of objects, and the context.

At block 610, the impact to be rendered is identified. In an embodiment, the impact comprises a change in size, change in shape, change in color, change in sound, or change in position of the plurality of objects in the interactive surface environment. If the decision dataset is not matching with the predefined datasets, then the method proceeds to block 612 via "NO" where the method ends.

At block 614, the impact is rendered on one or more objects, the target object and/or the one or more users 106 and/or the interactive surface environment 102 itself. In one implementation, upon identifying the impact to be rendered, if the interactive system 100 identifies that an impact context is same as the context determined at block 604, the interactive system 100 may not render the impact on the one or more objects. The impact context may be defined as a context which will be obtained once the impact is rendered on the one or more objects.

Computer System

Figure 7:
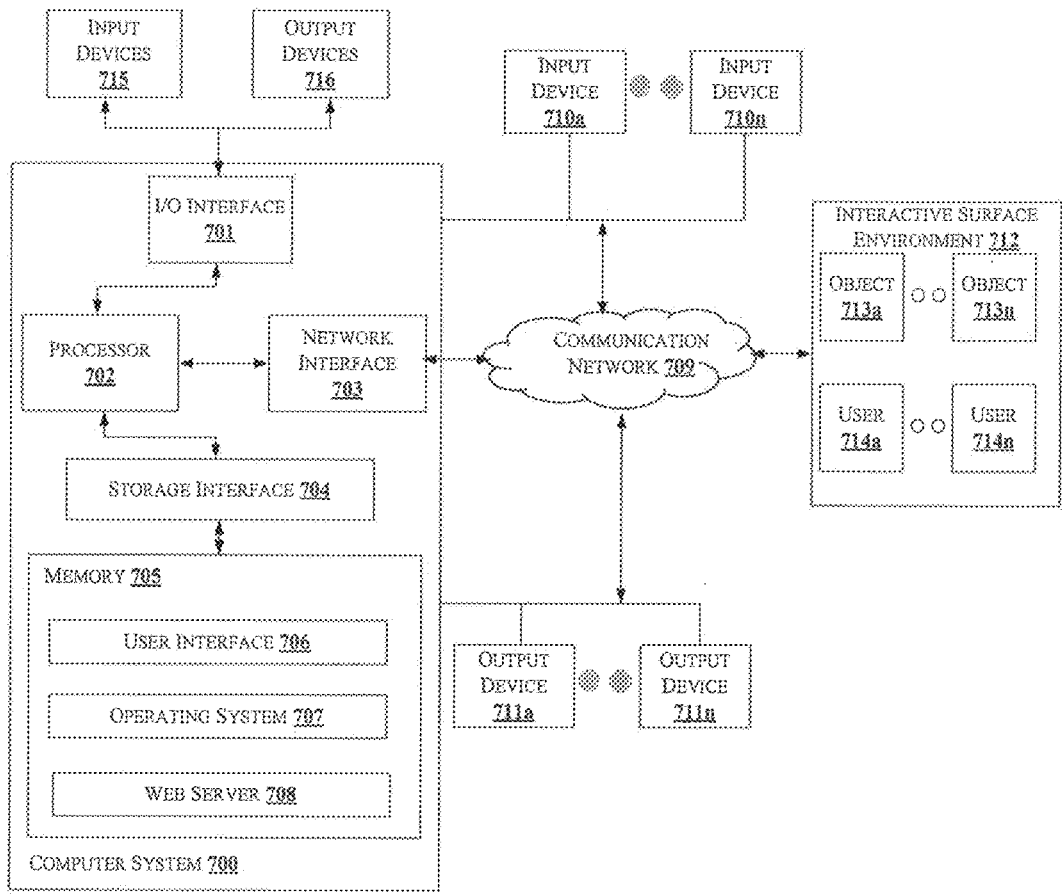
FIG. 7 is a block diagram of an exemplary computer system for implementing embodiments consistent with the present disclosure.

FIG. 7 illustrates a block diagram of an exemplary computer system 700 for implementing embodiments consistent with the present disclosure. In an embodiment, the computer system 700 is used to implement the interactive system 100. The computer system 700 may comprise a central processing unit ("CPU" or "processor") 702. The processor 702 may comprise at least one data processor for executing program components for executing system-gestures, motions, target object parameters, object parameters and context parameters. The processor 702 may include specialized processing units such as integrated system (bus) controllers, memory management control units, floating point units, graphics processing units, digital signal processing units, etc.

The processor 702 may be disposed in communication with one or more input/output (I/O) devices (not shown) via I/O interface 701. The I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the 1/O interface 701, the computer system 700 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 700 is connected to the one or more output devices 710a, . . . , 710n, the one or more input devices 711a, . . . , 711n, and the interactive surface environment 712 having the one or more objects 714a, . . . , 714n and the one or more users 716a, . . . , 716n through a communication network 709. The processor 702 may be disposed in communication with the communication network 709 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 709 may include, without limitation, a direct interconnection, local area network (LAN), wide area network (WAN), wireless network (e.g., using Wireless Application Protocol), the Internet, etc. Using the network interface 703 and the communication network 709, the computer system 700 may communicate with the one or more output devices 710a, . . . , 710n, the one or more input devices 711a, . . . , 711n, and the interactive surface environment 612 having the one or more objects 714a, . . . , 714n and the one or more users 716a, . . . , 716n. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 709 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The communication network 709 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 609 may include a variety of network devices, including routers, bridges, servers, computing devices, storage devices, etc.

In some embodiments, the processor 702 may be disposed in communication with a memory 705 (e.g., RAM, ROM, etc. not shown in FIG. 7) via a storage interface 704. The storage interface 704 may connect to memory 705 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707, web server 708 etc. In some embodiments, computer system 700 may store user/application data 706, such as the data, variables, records, etc. as described in this disclosure. Such databases may be implemented as fault-tolerant, relational, scalable, secure databases such as Oracle or Sybase.

The operating system 707 may facilitate resource management and operation of the computer system 700. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 700 may implement a web browser 707 stored program component. The web browser 708 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX, DHTML, Adobe Flash, JavaScript, Java, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 700 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Advantages of the embodiment of the present disclosure are illustrated herein.

Embodiments of the present disclosure enhances adaptability of the interactive surface environment by considering user gestures, context related parameters of the interactive surface environment and/or other user gestures and/or the one or more objects of the interactive surface environment.

Embodiments of the present disclosure consider state changes of the target object on which the user is performing gestures along with state changes of other objects relative to the target object as well. In such a way, the context and gestures received from other objects helps in determining the changes in the interactive surface environment so that the user is adapted to the changed interactive surface environment.

Embodiments of the present disclosure predict impacts which are reliably to result due to user gestures and state changes of the target and other objects.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
|---|---|
| Reference Number | Description |
| 100 | Interactive System |
| 102 | Interactive Surface Environment |
| 104a, . . . , 104n | Objects |
| 106a, . . . , 106n | Users |
| 108 | Input Device |
| 110a, . . . , 110n | Input Devices |
| 112 | Output Device |
| 114a, . . . , 114n | Output Devices |
| 202 | I/O Interface |
| 204 | Processor |
| 206 | Memory |
| 300 | Data |
| 302 | User Gestures Information |
| 304 | Context Related Parameters |
| 306 | Predefined Datasets |
| 308 | Other Data |
| 310 | Modules |
| 312 | Receiving Module |
| 314 | Context Identification Module |
| 316 | Aggregator Module |
| 318 | Impact Identification Module |
| 320 | Output Module |
| 322 | Other Modules |
| 700 | Computer System |
| 701 | I/O Interface |
| 702 | Processor |
| 703 | Network Interface |
| 704 | Storage Interface |
| 705 | Memory |
| 706 | User Interface |
| 707 | Operating System |
| 708 | Web Server |
| 709 | Communication Network |
| 710a, . . . , 710n | Input Devices |
| 711a, . . . , 711n | Output Devices |
| 712 | Interactive Surface Environment |
| 713a, . . . , 713n | Objects |
| 714a, . . . , 714n | Users |
| 715 | Input Devices |
| 716 | Output Devices |

What is claimed is:

1. A method for enhancing adaptability of an interactive surface environment having a plurality of objects, the method comprising:

receiving, by a hardware processor, at least one user gesture from a first user, performed on a target object from the plurality of objects;

identifying, by the hardware processor, a first context for each of the at least one user gesture before the user gesture is performed on the target object, based on the at least one user gesture, target object parameters, and object parameters;

identifying, by the hardware processor, a second context of the target object after the at least one user gesture is performed on the target object;

aggregating, by the hardware processor, the at least one user gesture performed on the target object, the first context, and the second context to obtain a decision dataset, wherein the decision dataset is obtained by identifying a preferred second user for changing the second context to a third context;

identifying, by the hardware processor, an impact, to be rendered, by comparing the decision dataset with predefined datasets;

determining, by the hardware processor, whether the third context obtained upon prospective rendering of the identified impact is different from the identified second context; and rendering, by the hardware processor, the impact on one or more objects from the plurality of objects in the interactive surface environment, when the third context obtained upon prospective rendering of the identified impact is different from the identified second context.

2. The method as claimed in claim 1, wherein each of the plurality of objects is one of a physical object and a virtual object.

3. The method as claimed in claim 1, wherein the target object parameters comprises at least one of a position, a shape, a sound, a size, or a color of the target object, and the object parameters comprises at least one of a position, a shape, a sound, a size, or a color of objects from the plurality of objects except the target object.

4. The method as claimed in claim 1, wherein the at least one user gesture comprises movement of feet, movement of arms, movement of legs, movement of fingers, movement of legs, movement of hands, movement of head, and combination thereof.

5. The method as claimed in claim 1, wherein the impact comprises at least one of a change in size, change in shape, change in color, change in sound, or change in position of the plurality of objects in the interactive surface environment.

6. The method as claimed in claim 1, wherein the predefined datasets are received from a decision database, and each of the predefined datasets comprises the at least one user gesture input associated with one or more objects from the plurality of objects, and the context.

7. An interactive system for enhancing adaptability of an interactive surface environment having a plurality of objects comprising:
   a processor;
   a memory communicatively coupled to the processor, wherein the memory stores processor-executable instructions, which, on execution, cause the processor to:
      receive at least one user gesture from a first user, performed on a target object from the plurality of objects;
      identify a first context for each of the at least one user gesture before the user gesture is performed on the target object, based on the at least one user gesture, target object parameters, and object parameters;
      identify a second context of the target object after the at least one user gesture is performed on the target object;
      aggregating, by the interactive system, the at least one user gesture performed on the target object, the first context, and the second context to obtain a decision dataset, wherein the decision dataset is obtained by identifying a preferred second user for changing the second context to a third context;
      identify an impact, to be rendered, by comparing the decision dataset with predefined datasets;
      determine whether the third context obtained upon prospective rendering of the identified impact is different from the identified second context; and
      render the impact on one or more objects from the plurality of objects in the interactive surface environment, when the third context obtained upon prospective rendering of the identified impact is different from the identified second context.

8. The interactive system as claimed in claim 7, wherein each of the plurality of objects is one of a physical object and a virtual object.

9. The interactive system as claimed in claim 7, wherein the target object parameters comprises at least one of a position, a shape, a sound, a size, or a color of the target object, and the object parameters comprises at least one of a position, a shape, a sound, a size, or a color of objects from the plurality of objects except the target object.

10. The interactive system as claimed in claim 7, wherein the at least one user gesture comprises movement of feet, movement of arms, movement of legs, movement of fingers, movement of legs, movement of hands, movement of head, and combination thereof.

11. The interactive system as claimed in claim 7, wherein the impact comprises at least one of a change in size, change in shape, change in color, change in sound, or change in position of the plurality of objects in the interactive surface environment.

12. The interactive system as claimed in claim 7, wherein the predefined datasets are received from a decision database, and each of the predefined datasets comprises the at least one user gesture input associated with one or more objects from the plurality of objects, and the context.

13. A non-transitory computer readable medium including instructions stored thereon that when processed by a processor cause an interactive system for enhancing adaptability of an interactive surface environment having a plurality of objects by performing acts of:
   receiving at least one user gesture from a first user, performed on a target object from the plurality of objects;
   identifying a first context for each of the at least one user gesture before the user gesture is performed on the target object based on the at least one user gesture, target object parameters, and object parameters;
   identifying a second context of the target object after the at least one user gesture is performed on the target object;
   aggregating the at least one user gesture performed on the target object, the first context, and the second context to obtain a decision dataset, wherein the decision dataset is obtained by identifying a preferred second user for changing the second context to a third context;
   identifying an impact, to be rendered, by comparing the decision dataset with predefined datasets;
   determining whether the third context obtained upon prospective rendering of the identified impact is different from the identified second context; and
   rendering the impact on one or more objects from the plurality of objects in the interactive surface environment, when the third context obtained upon prospective rendering of the identified impact is different from the identified second context.

14. The medium as claimed in claim 13, wherein each of the plurality of objects is one of a physical object and a virtual object.

15. The medium as claimed in claim 13, wherein the target object parameters comprises at least one of a position, a shape, a sound, a size, or a color of the target object, and the object parameters comprises at least one of a position, a shape, a sound, a size, or a colour of objects from the plurality of objects except the target object.

16. The medium as claimed in claim 13, wherein the at least one user gesture comprises movement of feet, movement of arms, movement of legs, movement of fingers, movement of legs, movement of hands, movement of head, and combination thereof.

17. The medium as claimed in claim 13, wherein the impact comprises at least one of a change in size, change in shape, change in colour, change in sound, or change in position of the plurality of objects in the interactive surface environment.

18. The medium as claimed in claim 13, wherein the predefined datasets are received from a decision database, and each of the predefined datasets comprises the at least one user gesture input associated with one or more objects from the plurality of objects, and the context.

19. The method of claim 1, further comprising storing the at least one user gesture as a new gesture when the at least one user gesture is not one of a predefined gesture.

20. The method of claim 1, further comprising, upon placement of a new object in the interactive surface environment:
   identifying a change in a context of the interactive surface environment; and
   adapting a behavior of the target object based on the identified change in the context.

* * * * *

UNITED STATES PATENT AND TRADEMARK OFFICE
CERTIFICATE OF CORRECTION

PATENT NO. : 10,042,427 B2  
APPLICATION NO. : 14/859836  
DATED : August 7, 2018  
INVENTOR(S) : Sangita Ganesh et al.

Page 1 of 1

It is certified that error appears in the above-identified patent and that said Letters Patent is hereby corrected as shown below:

On the Title Page

Item (57), Line 5, "The further comprises" should read -- The method further comprises --.

Signed and Sealed this  
Thirtieth Day of October, 2018

Andrei Iancu  
*Director of the United States Patent and Trademark Office*